(12) United States Patent
Schroll

(10) Patent No.: US 7,516,672 B2
(45) Date of Patent: Apr. 14, 2009

(54) PROBE INCLUDING PRESSURE SENSITIVE SENSORS

(75) Inventor: Thomas Schroll, Traunreut (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 3 days.

(21) Appl. No.: 11/726,181

(22) Filed: Mar. 20, 2007

(65) Prior Publication Data

US 2007/0283762 A1    Dec. 13, 2007

(30) Foreign Application Priority Data

Mar. 28, 2006  (DE) .................... 10 2006 014 232

(51) Int. Cl.
*G01L 9/00* (2006.01)
(52) U.S. Cl. .......................... 73/756; 33/556
(58) Field of Classification Search ................ 73/700, 73/756; 303/503, 556, 561; 33/503, 556, 33/561
See application file for complete search history.

(56) References Cited

U.S. PATENT DOCUMENTS

| | | | |
|---|---|---|---|
| 4,441,257 A | * | 4/1984 | Golinelli et al. ............... 33/561 |
| 4,523,382 A | * | 6/1985 | Werner et al. ................. 33/556 |
| 5,083,379 A | * | 1/1992 | Enderle et al. ................ 33/556 |
| 5,090,131 A | | 2/1992 | Deer |
| 5,724,745 A | * | 3/1998 | Brenner et al. ................ 33/503 |
| 2007/0062057 A1 | | 3/2007 | Schopf |

FOREIGN PATENT DOCUMENTS

| | | |
|---|---|---|
| EP | 0 423 307 | 4/1991 |
| EP | 0 578 910 | 1/1994 |
| EP | 1 762 818 | 3/2007 |
| JP | 5-87509 | 4/1993 |

OTHER PUBLICATIONS

Search Report, European Patent Application No. 06 02 1290, dated Apr. 26, 2007.

* cited by examiner

*Primary Examiner*—Andre J Allen
(74) *Attorney, Agent, or Firm*—Kenyon & Kenyon LLP

(57) ABSTRACT

A probe includes a sensor having a pressure-sensitive surface, electrical signals being producible by the sensor when pressure forces are acting that have a directional component orthogonal to the pressure-sensitive surface. The probe includes a probe element, which is supported in a movable manner relative to the sensor, and a mechanical transmission element. The probe includes a diaphragm, which is arranged between the transmission element and the pressure-sensitive surface of the sensor. The probe element, the transmission element, the diaphragm and the sensor are in a mechanical operative connection such that by contacting the probe element, a change in the level of the electrical signal is producible by the sensor.

25 Claims, 4 Drawing Sheets

PROBE INCLUDING PRESSURE SENSITIVE SENSORS

CROSS-REFERENCE TO RELATED APPLICATIONS

The present application claims priority to Application No. 10 2006 014 232.2, filed in the Federal Republic of Germany on Mar. 28, 2006, which is expressly incorporated herein in its entirety by reference thereto.

FIELD OF THE INVENTION

The present invention relates to a probe, having pressure-sensitive sensors.

BACKGROUND INFORMATION

A probe system normally includes a mobile probe and a stationary part. Such a probe is often used in the form of a probe switch or a switching probe having a deflectable probe element which emits a switching signal in response to a deflection out of its rest position. Such probes are used, e.g., for determining the position of workpieces. These are generally clamped into material-working machines, machine tools for example. In this context, the rest position of the probe element or a feeler corresponds to a position in which the feeler has no contact with the workpiece to be probed. When the feeler contacts the workpiece, the probe element is deflected from its rest position, even if only minimally, and an electrical signal is produced by a suitable transducer if the deflection or the force exerted on sensors in the probe exceeds a specified threshold. The electrical signal is generally converted into an infrared signal so that a contactless and wireless signal transmission to the stationary part of the probe system is achieved in this manner.

European Published Patent Application No. 0 423 307 describes a probe, in which arms of a probe element or feeler holder cause deformations in so-called seating elements when making probing contact, the deformations being measured and being able to trigger corresponding probe signals. For this purpose, the seating elements are arranged slanted or arched in opposite pairs. Such an arrangement is believed to have several disadvantages. For example, following repeated deflection of the probe element, an exact position of the introduction of force into the sensors cannot be ensured in a reproducible manner.

SUMMARY

According to example embodiments of the present invention, a probe may have an exceedingly exact and reproducible probe performance and may nevertheless be robust and durable.

The probe may include at least one sensor having a pressure-sensitive surface. Under the influence of pressure forces, which have a directional component orthogonal to the pressure-sensitive surface, the sensor generates electrical signals. Pressure-sensitivity in this context particularly refers to a contact pressure emanating from another body. The probe furthermore includes a probe element, which is supported in a movable manner relative to the sensor, and a mechanical transmission element. The probe furthermore includes a diaphragm, which is arranged between the transmission element and the pressure-sensitive surface of the sensor. In the probe, the probe element, the transmission element, the diaphragm and the sensor are in a mechanical operative connection such that by deflecting or contacting the probe element—e.g., a feeler belonging to the probe element—a change in the level of the electrical signal may be generated by the sensor.

The mechanical operative connection may be provided in that the probe element, the transmission elements, the diaphragm and the sensors are arranged in a contacting manner such that pressure forces introduced by the probe element are transmitted into the sensors via the transmission elements.

The mechanical transmission element may take the form of a separate body. Alternatively, however, the mechanical transmission element may also be integrated into the probe element, for example. The mechanical transmission element may have a convex contour, the diaphragm, e.g., being arranged between the convex contour of the transmission element and the pressure-sensitive surface of the sensor. The transmission element thus has at least in a subsection a convex contour, that is, an outer surface that is vaulted or rounded toward the outside. The transmission elements may be arranged as spheres.

The contact surface, which is created when the mechanical transmission element contacts the diaphragm, may be smaller than the contact surface of the pressure-sensitive surface of the sensor on the diaphragm. In other words, (with a view to the introduction of pressure forces) the active area of the mechanical transmission element with respect to the diaphragm is smaller than the active area of the diaphragm on the pressure-sensitive surface of the sensor.

A transmission element may be located geometrically between one arm of the probe element and the diaphragm, the transmission element contacting both the respective arm of the probe element as well as the diaphragm in a rest position and/or a deflected position of the probe element. The diaphragm is in contact with the pressure-sensitive surface of the sensor and with the transmission element.

The probe or the mentioned operative connection may be arranged such that the pressure forces are directed substantially perpendicularly to the pressure-sensitive surface of the sensors.

The pressure-sensitive surface of the sensor may be flat. In the region arranged between the optionally convex contour of the transmission element and the pressure-sensitive surface of the sensor, the diaphragm itself may be flat or planar.

It should be noted that in the use of pressure-sensitive sensors, extremely small deflection movements normally result in a switching of the probe. Accordingly, the rest position usually hardly deviates from the deflected position. Nevertheless, the probe element may be said to be deflectable with respect to the sensors because the probe element is movably supported with respect to the sensors.

The probe may be configured such that it has multiple sensors and multiple mechanical transmission elements and the diaphragm is, in each case, arranged between the transmission elements, it being possible for the diaphragm to be provided in one piece. The diaphragm may be a metal part.

The probe may be arranged such that the diaphragm lies loosely on the surface of the sensor, e.g., that the diaphragm is not fixedly connected to the surface of the sensor, e.g., is not cemented.

The diaphragm may have a thickness, in the region between the transmission element and the pressure-sensitive surface of the sensor, which is less than 1 mm, e.g., less than 0.5 mm, e.g., less than 0.25 mm.

The probe may be constructed such that the sensors are arranged in a plane that is situated perpendicular to the longitudinal axis of the probe element or of the feeler. For this purpose, three sensors offset by 120° may be used, which are respectively equidistant with respect to the longitudinal axis of the probe element.

Example embodiments of the present invention may increase the service life of the sensitive sensors because the face pressure on the respective pressure-sensitive surface of the sensor is reduced. However, the system as a whole is also damped by using a diaphragm, which is considered advantageous particularly if the probe in measuring operation is exposed to great accelerations in a machine tool, since, in that case, the sensors may often produce false signals.

According to an example embodiment of the present invention, a probe includes: at least one sensor having a pressure-sensitive surface, the sensor configured to produce electrical signals in response to pressure forces that have a directional component orthogonal to the pressure-sensitive surface; a probe element supported movably relative to the sensor; a mechanical transmission element; and a diaphragm arranged between the transmission element and the pressure-sensitive surface of the sensor. The probe element, the transmission element, the diaphragm and the sensor are mechanically operatively connected such that contact of the probe element produces a change in a level of the electrical signal by the sensor.

The mechanical transmission element may include a convex contour, and the diaphragm may be arranged between the convex contour of the transmission element and the pressure-sensitive surface of the sensor.

The transmission element may be spherical.

The pressure-sensitive surface of the sensor may be flat.

The probe may include a plurality of sensors and a plurality of mechanical transmission elements, the diaphragm may be arranged between the transmission elements and the pressure-sensitive surfaces of the sensors, and the diaphragm may be arranged as a one-piece component.

The diaphragm may be arranged as a metal part.

The diaphragm, in a region between the transmission element and the pressure-sensitive surface of the sensor, may have a thickness of less than 1 mm.

The diaphragm, in a region between the transmission element and the pressure-sensitive surface of the sensor, may have a thickness of less than 0.5 mm.

The sensor may include a piezoresistive silicon chip.

The sensors may be arranged 120° relative to each other.

The diaphragm may be configured to damp at least one of (a) accelerations and (b) vibrations during a measuring operation to reduce false triggering.

The probe element may include a feeler and a feeler holder.

The feeler holder may include a pair of arms corresponding to each sensor and in contact with the transmission element.

The probe may include holding element having a bore hole corresponding to each sensor, a sphere of the transmission element may be arranged in each bore hole, and the holding element may be configured to press each sphere against the diaphragm and against the corresponding sensor at a defined contact force without play.

Each sphere may be adhesively connected to the holding element.

The probe may include at least one spring preloading the feeler holder against the sensor.

The diaphragm may be fixed in position relative to the sensor and not fixedly connected to the sensor.

The diaphragm may include a flat region arranged on the pressure-sensitive surface of the sensor.

The diaphragm may formed of bent sheet-metal.

According to an example embodiment of the present invention, a probe includes: a plurality of sensors, each sensor having a pressure-sensitive surface, the sensors configured to produce electrical signals in response to pressure forces that have a directional component orthogonal to the pressure-sensitive surfaces; a probe element supported movably relative to the sensors; a mechanical transmission element; and a diaphragm arranged between the transmission element and the pressure-sensitive surfaces of the sensors. The probe element, the transmission element, the diaphragm and the sensors are mechanically operatively connected such that contact of the probe element produces a change in a level of the electrical signal by the sensors.

According to an example embodiment of the present invention, a probe includes: sensing means, including a pressure-sensitive surface, for producing electrical signals in response to pressure forces that have a directional component orthogonal to the pressure-sensitive surface; probe means supported movably relative to the sensing means; mechanical transmitting means; and diaphragm means arranged between the transmitting means and the pressure-sensitive surface of the sensing means. The probe means, the transmitting means, the diaphragm means and the sensing means are mechanically operatively connected such that contact of the probe means produces a change in a level of the electrical signal by the sensing means.

Further details and aspects of the probe according to example embodiments of the present invention are described in more detail below with reference to the appended Figures.

DETAILED DESCRIPTION

Figure 1:
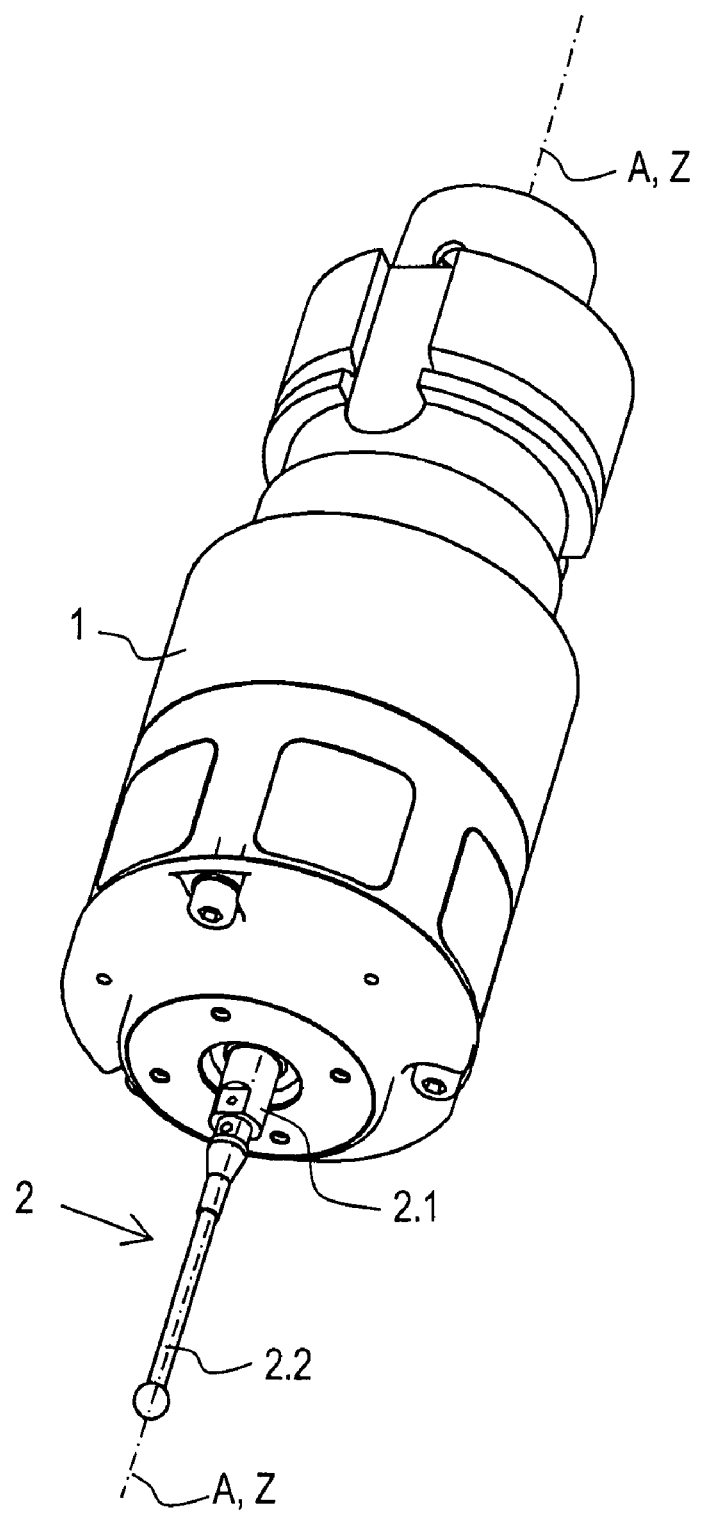
FIG. 1 is a perspective view of a probe.

FIG. 1 illustrates a probe in a perspective external view. The probe includes a housing 1 having a probe element 2 projecting from it. Probe element 2 has a longitudinal axis A, which in the rest state or in the rest position at the same time represents the longitudinal axis Z of housing 1. In the exemplary embodiment illustrated, probe element 2 includes two parts, e.g., a feeler holder 2.1 and a feeler 2.2, to which in FIG. 1 at the bottom a probing contact sphere is attached as a feeler end. Feeler 2.2 further has a rupture joint. Feeler holder 2.1 and feeler 2.2 are detachably connected to each other by a screw connection. Feeler holder 2.1 of probe element 2 has at one end three arms 2.11 offset by 120° (see, e.g., FIG. 5). Two parallel cylindrical members 2.111 are attached on the bottom side of each arm 2.11. On the radial outer ends of arms 2.11, there is in each case an offset.

Figure 2A:
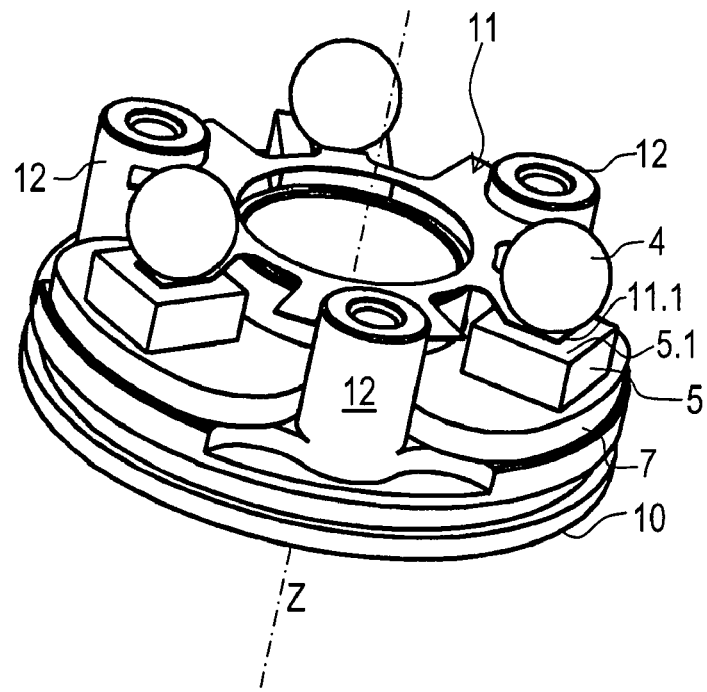
FIG. 2a is a perspective view of a measuring device in the probe without a holding element.
Figure 2B:
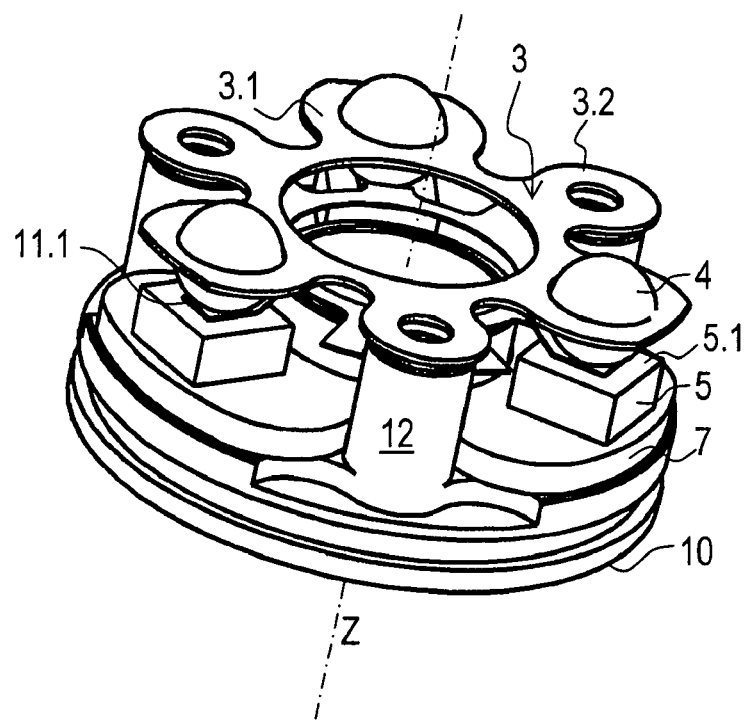
FIG. 2b is a perspective view of a measuring device in the probe with a holding element.

FIGS. 2a and 2b illustrate a measuring device, as is arranged in the interior of housing 1. A circuit board 7, on which three sensors 5 are mounted, is located on a substantially disk-shaped base member 10. In the exemplary embodiment illustrated, pressure sensor elements are used as sensors 5, which are based on piezoresistive silicon chips. These sensors 5 have a pressure-sensitive surface 5.1, on which pn-insulated bridge resistors are arranged. A flat region 11.1 of a diaphragm 11 is arranged on the surface 5.1 of each sensor 5. Diaphragm 11 is arranged as a one-piece bent metal part, which has a thickness of, e.g., 0.1 mm. Diaphragm 11 thus contacts all sensors 5 and is fixed in a stationary manner relative to sensors 5, but lies loosely on surfaces 5.1 of each sensor 5, that is, diaphragm 11 is not fixedly connected to surfaces 5.1 themselves. Spheres 4, which are used as mechanical transmission elements, rest on flat regions 11.1 of diaphragm 11.

In order for spheres 4 to be always positioned exactly relative to sensors 5, a holding element 3 (see, e.g., FIG. 2b) is provided, which is fixed in a stationary manner with respect to sensors 5. In the exemplary embodiment illustrated, holding element 3 is arranged as a separate one-piece component, e.g., as a sheet metal component having a thickness of, e.g., 0.25 mm. Holding element 3 has three tabs 3.1 offset by 120° along a circumferential line, having each one bore hole. The inner diameter of the bore hole is somewhat smaller than the outer diameter of spheres 4. Moreover, holding element 3 includes three additional tabs 3.2, which have bore holes. Holding element 3 is centrosymmetric with respect to a point, which is at the same time the center point of a central bore hole.

Figure 3:
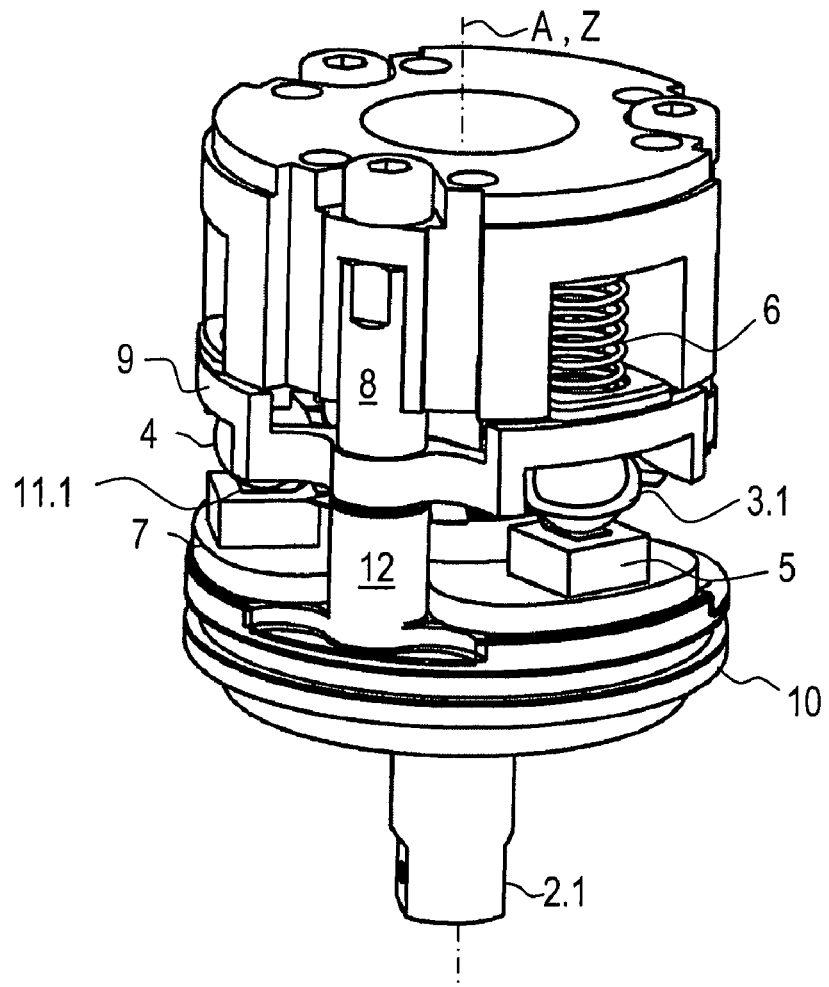
FIG. 3 is a perspective view of the probe without a housing.

FIG. 3 is a perspective view of the probe without a housing. In the assembly of the probe, circuit board 7 having sensors 5 mounted on it is fixed with accuracy of fit on base member 10. Subsequently, diaphragm 11 is provided on surfaces 5.1 of sensors 5. The one-piece form of diaphragm 11 and the adaptation and contact to three aligning pins 12 allow for diaphragm 11 to be positioned exactly in a simple manner. Diaphragm 11 is fixed relative to housing 1, while diaphragm 11 is not fixedly connected to surfaces 5.1 of sensors 5, which it touches. Subsequently, spheres 4 are provided on the flat regions 11.1 of diaphragm 11. Holding element 3 is then set on spheres 4 such that the spheres partially penetrate through the bore holes in tabs 3.1. Afterwards, bolts 8 are inserted through openings of a ring member 9 and through the bore holes of additional tabs 3.2 and screwed into an internal screw thread in base member 10. Since bolts 8 have highly accurately machined outer surfaces, which fit without play into the bore holes of additional tabs 3.2, holding element 3 and thus also spheres 4 are positioned exactly relative to the sensors in a plane perpendicular to the Z axis. But the positioning of spheres 4 occurs with accuracy of fit also in a direction parallel to the Z axis, since holding element 3 is pressed by its front side against a surface of base member 10. As a result, the comparatively thin holding element 3 is elastically deformed in the region of tabs 3.1 such that spheres 4 are pressed against diaphragm 11, and thus also against sensors 5, at a defined contact force and are thus mounted without play. This provides that spheres 4 are constantly in contact with the respective flat regions 11.1 of diaphragm 11. An adhesive connection between spheres 4 and holding element 3 prevents the spheres from turning relative to holding element 3 and thus also relative to the respective surface 5.1 of sensors 5.

Figure 5:
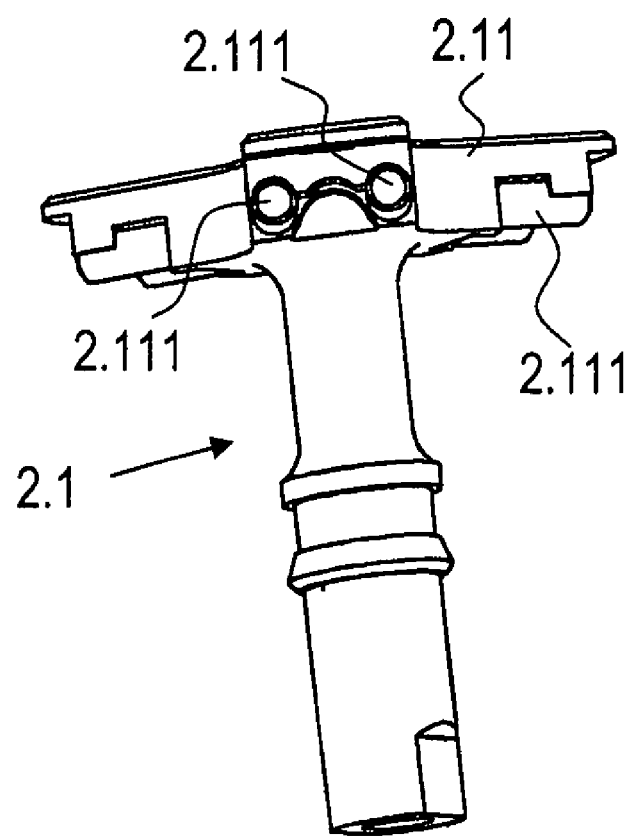
FIG. 5 is a detailed view of the feeler holder.

In the assembly of the probe, among other things, feeler holder 2.1 of probe element 2, as illustrated in FIG. 5, is inserted through the central opening such that it ultimately rests on spheres 4. Arms 2.11 of feeler holder 2.1 are configured on their bottom sides such that they have two parallel directed cylindrical members 2.111, whose clearance is smaller than the diameter of spheres 4. As a result, each sphere 4 comes to lie between a pair of these cylindrical members 2.111. Feeler holder 2.1 is preloaded by springs 6 and is then mounted movably relative to housing 1 and thus also relative to sensors 5.

Figure 4:
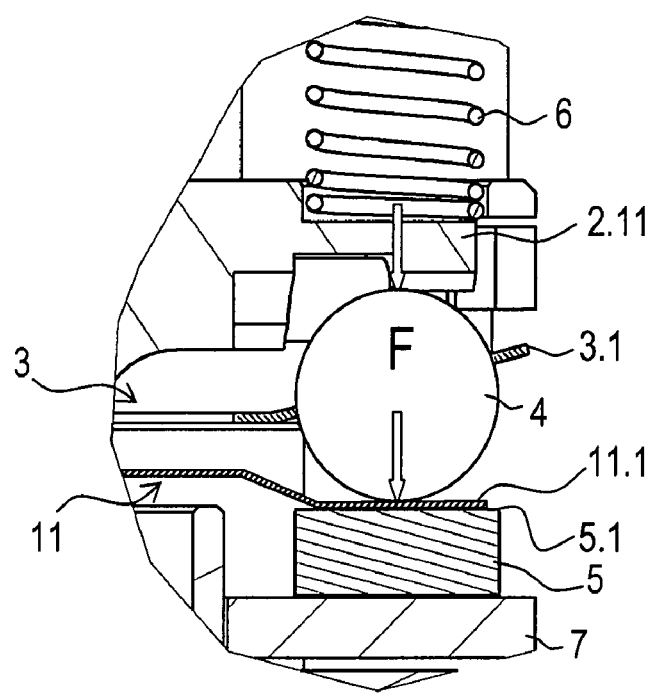
FIG. 4 is a detailed view of the measuring device of the probe.

In the measuring operation, the probe travels, for example, within the machining space of a machine tool. As soon as the probing contact sphere contacts an obstacle—a workpiece to be measured, for example—the entire probe element 2 is deflected, even if only slightly. The deflected or switching position is reached before an arm 2.11 of probe element 2 loses mechanical contact to the respective sphere 4. This prevents the formation of a direction-dependent switching characteristic. In the operation of the probe, a supply voltage for supplying sensors 5 is introduced via circuit board 7. The contact of probe element 2 changes pressure forces F (see, e.g., FIG. 4), which act on sensors 5, which has the consequence of a change in the level of the electrical signal of at least one of sensors 5. The electrical signals are transmitted to another circuit board within housing 1 of the probe, where they are processed further in a suitable electronic circuit such that the respective switching signals are converted into electromagnetic signals, which are sent to a stationary receiver station.

The stationary receiving station is fixed in an immobile component of the machine tool, for example. From this stationary receiving station, the received signal is forwarded to electronics, for example, in the control system of the machine tool, where the position of the probing contact sphere is determined and at the same time the machine is stopped.

Spheres 4 are used as transmission devices to provide for a nearly punctiform contact area on flat region 11.1 of diaphragm 11. Accordingly, pressure forces F are directed perpendicularly or orthogonally to the respective surface 5.1, which results in an optimal signal yield or signal amplitude. On the other hand, the face pressure is comparatively high due to the small, nearly punctiform contact surface between spheres 4 and diaphragm 11. Diaphragm 11 provides that the pressure forces are distributed to a larger area of pressure-sensitive surface 5.1 such that the load on pressure-sensitive surface 5.1 of sensor 5 is reduced. Nevertheless, the system as a whole remains extremely sensitive since diaphragm 11 in the region between the convex contour of the transmission element, that is, sphere 4, and pressure-sensitive surface 5.1 of sensor 5 has an extremely small thickness, which measures, e.g., 0.1 mm in the present exemplary embodiment. Added to this is that, due to friction effects between the flat region 11.1 of diaphragm 11 and sphere 4 and particularly between flat region 11.1 of diaphragm 11 and pressure-sensitive surface 5.1 of sensor 5, a damping of the system as a whole is achieved, which does not impair the sensitivity, but makes the probe more secure against false triggerings. Frequently, a probe in a machine tool is exposed to great accelerations and/or vibrations during measuring operations. These may result in extremely short-lived forces on the probe element. The specified damping characteristic of the probe contributes to preventing sensor 5 from mistakenly producing electrical signals.

Holding element 3 provides that spheres 4 in each case rest reproducibly at the correct point on surface 5.1 of sensors 5. This is particularly important if one considers that the deflection signal is composed of all three individual signals of sensors 5, pressure force F being reduced for all sensors 5 or only for a partial number of sensors 5 when probe element 2, e.g., feeler 2.2, is contacted. The first case occurs, for example, if the workpiece to be measured is approached from a direction parallel to longitudinal axis A of probe element 2. Against the forces of springs 6, the three arms 2.11 of probe element 2 lift off, possibly completely, from spheres 4. Spheres 4, however, remain positioned without change relative to sensors 5 with the aid of holding element 3.

As soon as, following the probing contact, probe element 2 or feeler holder 2.1 returns to its rest position, the three arms 2.11 again rest exactly on spheres 4, the curvature of spheres 4 having an aligning or centering effect on probe element 2.

The type of construction described thus produces a probe, which is characterized by its long service life and which reproducibly works in an extremely exact manner even after many probing contact operations and in so doing may be insensitive to outside influences.

What is claimed is:

1. A probe, comprising:
   at least one sensor having a pressure-sensitive surface, the sensor configured to produce electrical signals in response to pressure forces that have a directional component orthogonal to the pressure-sensitive surface;
   a probe element supported movably relative to the sensor;
   a mechanical transmission element; and
   a diaphragm arranged between the transmission element and the pressure-sensitive surface of the sensor;
   wherein the probe element, the transmission element, the diaphragm and the sensor are mechanically operatively connected such that pressure forces introduced by the probe element are transmitted into the sensor via the transmission element and contact of the probe element produces a change in a level of the electrical signal by the sensor.

2. The probe according to claim 1, wherein the mechanical transmission element includes a convex contour, the diaphragm arranged between the convex contour of the transmission element and the pressure-sensitive surface of the sensor.

3. The probe according to claim 1, wherein the transmission element is spherical.

4. The probe according to claim 1, wherein the pressure-sensitive surface of the sensor is flat.

5. The probe according to claim 1, wherein the probe includes a plurality of sensors and a plurality of mechanical transmission elements, the diaphragm arranged between the transmission elements and the pressure-sensitive surfaces of the sensors, the diaphragm arranged as a one-piece component.

6. The probe according to claim 1, wherein the diaphragm is arranged as a metal part.

7. The probe according to claim 1, wherein the diaphragm, in a region between the transmission element and the pressure-sensitive surface of the sensor, has a thickness of less than 1 mm.

8. The probe according to claim 1, wherein the diaphragm, in a region between the transmission element and the pressure-sensitive surface of the sensor, has a thickness of less than 0.5 mm.

9. The probe according to claim 1, wherein the sensor includes a piezoresistive silicon chip.

10. The probe according to claim 5, wherein the sensors are arranged 120° relative to each other.

11. The probe according to claim 1, wherein the diaphragm is configured to damp at least one of (a) accelerations and (b) vibrations during a measuring operation to reduce false triggering.

12. The probe according to claim 1, wherein the probe element includes a feeler and a feeler holder.

13. The probe according to claim 12, wherein the feeler holder includes a pair of arms corresponding to each sensor and in contact with the transmission element.

14. The probe according to claim 1, further comprising a holding element having a bore hole corresponding to each sensor, a sphere of the transmission element arranged in each bore hole, the holding element configured to press each sphere against the diaphragm and against the corresponding sensor at a defined contact force without play.

15. The probe according to claim 14, wherein each sphere is adhesively connected to the holding element.

16. The probe according to claim 12, further comprising at least one spring preloading the feeler holder against the sensor.

17. The probe according to claim 1, wherein the diaphragm is fixed in position relative to the sensor and not fixedly connected to the sensor.

18. The probe according to claim 1, wherein the diaphragm includes a flat region arranged on the pressure-sensitive surface of the sensor.

19. The probe according to claim 1, wherein the diaphragm is formed of bent sheet-metal.

20. A probe, comprising:
    a plurality of sensors, each sensor having a pressure-sensitive surface, the sensors configured to produce electrical signals in response to pressure forces that have a directional component orthogonal to the pressure-sensitive surfaces;
    a probe element supported movably relative to the sensors;
    a mechanical transmission element; and
    a diaphragm arranged between the transmission element and the pressure-sensitive surfaces of the sensors;
    wherein the probe element, the transmission element, the diaphragm and the sensors are mechanically operatively connected such that pressure forces introduced by the probe element are transmitted into the sensor via the transmission element and contact of the probe element produces a change in a level of the electrical signal by the sensors.

21. A probe, comprising:
    sensing means, including a pressure-sensitive surface, for producing electrical signals in response to pressure forces that have a directional component orthogonal to the pressure-sensitive surface;
    probe means supported movably relative to the sensing means;
    mechanical transmitting means; and
    diaphragm means arranged between the transmitting means and the pressure-sensitive surface of the sensing means;
    wherein the probe means, the transmission means, the diaphragm means and the sensing means are mechanically operatively connected such that pressure forces introduced by the probe means are transmitted into the sensing means via the transmitting means and contact of the probe means produces a change in a level of the electrical signal by the sensing means.

22. The probe according to claim 1, wherein the transmission element is arranged between the probe element and the diaphragm.

23. The probe according to claim 20, wherein the transmission element is arranged between the probe element and the diaphragm.

24. The probe according to claim 21, wherein the transmission element is arranged between the probe element and the diaphragm.

25. A probe, comprising:
    at least one sensor having a pressure-sensitive surface, the sensor configured to produce electrical signals in response to pressure forces that have a directional component orthogonal to the pressure-sensitive surface;
    a probe element supported movably relative to the sensor;
    a mechanical transmission element; and a diaphragm arranged between the transmission element and the pressure-sensitive surface of the sensor, the transmission element arranged between the probe element and the diaphragm;

wherein the probe element, the transmission element, the diaphragm and the sensor are mechanically operatively connected such that pressure forces caused by contact of the probe element are transmitted from the probe element to the sensor via the transmission element to produce a change in a level of the electrical signal by the sensor.

* * * * *